United States Patent [19]

Hirota

[11] 4,178,606
[45] Dec. 11, 1979

[54] COLOR VIDEO SIGNAL RECORDING AND/OR REPRODUCING SYSTEM

[75] Inventor: Akira Hirota, Chigasaki, Japan

[73] Assignee: Victor Company of Japan, Ltd., Yokohama, Japan

[21] Appl. No.: 731,935

[22] Filed: Oct. 13, 1976

[30] Foreign Application Priority Data

Oct. 17, 1975 [JP] Japan .............................. 50-124311
Jan. 30, 1976 [JP] Japan .............................. 51-8937

[51] Int. Cl.² .......................................... H04N 5/79
[52] U.S. Cl. .................................................. 358/4
[58] Field of Search ....................... 358/4, 8; 360/33

[56] References Cited

FOREIGN PATENT DOCUMENTS

2239831 2/1975 France .

*Primary Examiner*—John C. Martin

[57] ABSTRACT

A color video signal recording system frequency modulates a luminance signal separated from an input color video signal. A first signal processing means converts the frequency of the carrier chrominance signal separated from the input color video signal. The conversion is to a band which is lower than the band of the frequency-modulated luminance signal. The carrier chrominance signal is processed to advance the phase thereof, successively by 90° for every horizontal scanning period, during a specific period. Thereafter, the phase lags successively by 90° for every horizontal scanning period during a successive specific period. For recording, the said frequency-modulated luminance signal and carrier chrominance signal are multiplexed processed, and recorded on a plurality of tracks which are mutually disposed in parallel on a recording medium. The recording is performed in such a manner that a carrier chrominance signal of a phase advancing successively by 90° and a carrier chrominance signal of a phase lagging successively by 90° are in side-by-side disposition on mutual adjacent tracks.

A color video signal reproducing system reproduces a signal recorded by the above described recording system. The frequency-modulated luminance signal is demodulated after it is separated from the reproduced signal. A second signal processing means restores the signal which is processed carrier chrominance signal separated from the reproduced signal, into the original frequency band. The chrominance signal is phase shifted successively by 90° for every horizontal scanning period, thereby to restore the original carrier chrominance signal. The output signal of the second signal processing means is delayed one horizontal scanning period. The output signal of the second signal processing means and is mixed with the output signal of the delay means. The demodulated luminance signal is mixed with the output carrier chrominance signal of the mixing means, to produce a reproduced color video signal.

25 Claims, 8 Drawing Figures

COLOR VIDEO SIGNAL RECORDING AND/OR REPRODUCING SYSTEM

BACKGROUND OF THE INVENTION

The invention relates generally to color video signal recording and/or reproducing systems, and more particularly to systems for recording a color video signal on a recording medium, without spaces between adjacent tracks and without beat disturbances, and to systems for reproducing the signal thus recorded.

In a conventional video signal recording and reproducing system the reproducing head simultaneously reproduces video signals recorded on mutually adjacent video tracks, as a consequence a tracking error which occurs at the time of reproducing. Beat disturbances then arise in the reproduced picture. Accordingly, in order to prevent a generation of beat disturbances, video tracks are recorded on a recording medium with unrecorded areas between them, called "guard bands".

The beat disturbances decrease as the width of the guard bands increase. There is a poor utilization efficiency of the recording medium. Therefore, from the standpoint of improving the utilization efficiency of a recording medium, it is desirable to reduce or eliminate the guard bands.

Accordingly, a known system, records and reproduces by means of heads having an obliquely directed gap. Thus, it is possible to reproduce in a manner which prevents a beat disturbance, even without guard bands. In this system, two heads have gaps with azimuths which are oppositely inclined with respect to the perpendicular of the scanning direction followed by the heads, for example. These heads are used to record a video signal alternately on a recording medium with contiguous tracks, without guard bands. In the reproducing system, a track is reproduced without loss if it has been recorded by a head having the same azimuth as a reproducing head. However, since the contiguous track has been recorded by a head having an azimuth of opposite direction, the reproducing loss is very great. As a result, almost no beat disturbance occurs from the contiguous track.

A system is capable of recording and reproducing color video signals with a relative narrow frequency band, when a color video signal is separated into a luminance signal and a carrier chrominance signal. The luminance signal is frequency modulated, and the carrier chrominance signal is frequency converted to a band which is lower than the frequency band of the frequency-modulated luminance signal. The resulting frequency-modulated luminance signal and frequency-converted carrier chrominance signal are multiplexed and recorded.

When this system is used with a recording system having azimuth heads, a high frequency band frequency-modulated luminance signal can be reproduced without beat disturbance. However, with regard to a frequency-converted chrominance signal in a low frequency band, there is a small reproducing loss due to azimuth. For this reason, there is a problem of preventing beat disturbances, due to reproduction of contiguous tracks.

SUMMARY OF THE INVENTION

Accordingly, a general object of the present invention is to provide a novel and useful color video signal recording and/or reproducing system which has solved the above described problems.

Another and more specific object of the invention is to provide a system capable of recording and reproducing a color video signal, without beat disturbance, on tracks which are in mutually contiguous relationship and without guard bands and with a relatively narrow frequency band. In a system according to the invention, a beat disturbance is prevented with respect to frequency-converted carrier chrominance signals despite recording and reproducing, with azimuths heads. The color video signal is a multiplexed signal of the frequency-modulated luminance signal and the frequency-converted carrier chrominance signal.

Still another object of the invention is to provide a system wherein a color video signal is recorded by advancing the phase of the signal recorded in one track by 90° for each horizontal scanning period and by lagging the phase of the signal recorded in an adjacent track by 90° for each horizontal scanning period. According to the invention, crosstalk components between mutually adjacent tracks are cancelled by this phase relationship. Beat disturbance does not occur.

A further object of the invention is to provide a system which is capable of recording and reproducing not only NTSC system color video signals but also PAL system color video signals on closely disposed, adjacent tracks without beat disturbances.

Other objects and further features of the present invention will be apparent from the following detailed description with respect to preferred embodiments of the invention when read in conjunction with the accompanying drawings.

DETAILED DESCRIPTION

One embodiment of a color video signal recording system according to the invention will first be described with reference to FIG. 1.

An NTSC system color video signal is applied to an input terminal 10. This signal is supplied to, for example, a low-pass filter 11 having an upper limit filtering frequency of 3 MHz, a band-pass filter 15 having a filtering band of 3.1 to 4.1 MHz, and a horizontal synchronizing signal separation circuit 17. A luminance signal which has passed through the low-pass filter 11 is frequency modulated by a frequency modulator 12. The resulting output frequency-modulated signal, has a frequency deviation of a band of 3.5 to 4.5 MHz. A high-pass filter 13 having a lower limit filtering frequency of 1.2 MHz, removes the unwanted component of this signal. Thereafter, it is supplied to a mixer 14.

A carrier chrominance signal which has passed through the band-pass filter 15 is fed to a frequency converter 16, where it is frequency converted responsive to a signal from a frequency converter 20 to a band which is lower than the band of the frequency-modulated luminance signal.

A horizontal synchronizing signal which has been separated by the horizontal synchronizing signal separation circuit 17 is frequency multiplied m/2 times (where m is an integer) by a frequency multiplier 18. The multiplied signal is frequency converted in the frequency converter 20 with a signal from a reference oscillator 19. The resulting output signal is supplied to the frequency converter 16.

Hereinafter, the frequency of the color sub-carrier of the carrier chrominance signal which has passed through the band-pass filter 15 is denoted by "fc" (3.579545 MHz in a color video signal of the NTSC system). The frequency of the color sub-carrier of the carrier chrominance signal frequency converted in the frequency converter 16 is called "fs". The horizontal scanning frequency is called "$f_H$" (15.734264 KHz the NTSC system). Here, frequency conversion is carried out in the frequency converter 16 in a manner such that the frequency fs of the color sub-carrier which is thus frequency converted assumes the value given by the following equation:

$$fs = \tfrac{1}{2} f_H \cdot m \quad (1)$$

In the instant embodiment, m=88; that is, the multiplying number of the frequency multiplier 18 is 44, and fs is 692.308 KHz. Furthermore, the oscillation frequency of the reference oscillator 19 is fc. In this connection, when m is an even number, as in the instant embodiment, the multiplying number of the frequency multiplier 18 becomes an integer, and the circuit of the frequency multiplier 18 can be made simple.

The output carrier chrominance signal of the frequency converter 16 is supplied to a phase shifter 22 of a phase shifting circuit 21. In order to facilitate an understanding of the operating principle of the phase shifting circuit 21, it is represented in FIG. 1 as comprising phase shifter 22 and switcher 23. The phase shifter 22 shifts the phase of the input signal by 0°, 90°, 180°, and 270°, respectively. The resulting output the resulting signals appear at fixed contact points a1, a2, a3, and a4. In the switcher 23, the rotatable contact is switched successively to the fixed contact points responsive to each horizontal scanning period. Its rotational direction is reversed alternately during each field period, as indicated by arrow X and Y. As a consequence, a signal is derived from the phase shifting circuit 21 with a phase advanced by 90° for each successive horizontal scanning period, during a certain field period. In the succeeding field period, a signal is derived with a phase which lags by 90° in each successive horizontal period.

The horizontal synchronizing signal is supplied from the horizontal synchronizing signal separation circuit 17 to a switcher control circuit 31. Furthermore, for every vertical scanning period (every field period) a signal is derived from a detector 30 in synchronism with the rotation of a rotating structure 28 and supplied to the switcher control circuit 31. The output signal of the switcher control circuit 31 controls the movable contact of the switcher 23 of the phase shifting circuit 21.

The resulting output signal of the phase shifting circuit 21 is sent through a low-pass filter 24, where its unwanted component is removed, and is thereafter supplied to mixer 14, where it is multiplexed with the frequency-modulated luminance signal. The resulting multiplexed signal is amplified in a recording amplifier 25 and then supplied to rotating heads 26a and 26b to be recorded for every alternate field on a traveling recording tape 27.

Figures 2, 3:
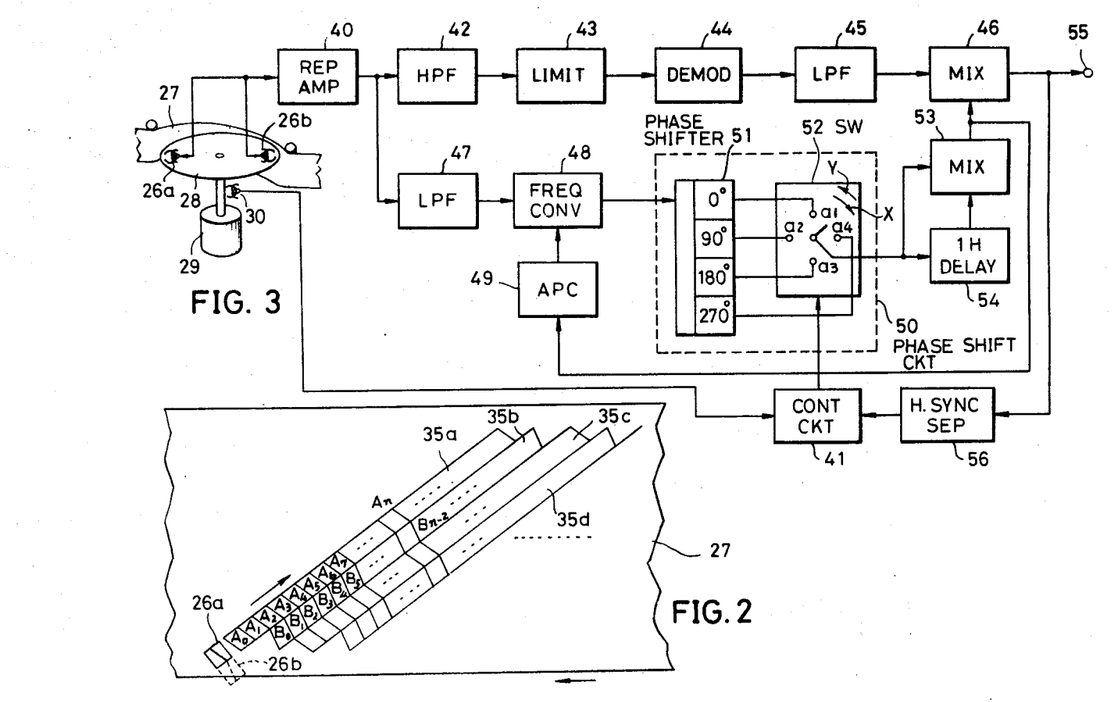
FIG. 2 is a fragmentary track pattern diagram of one part of a recording medium recorded by the recording system shown in FIG. 1.
FIG. 3 is a block diagram of the reproducing system in the first embodiment of the system of the invention.

The rotating heads 26a and 26b are mounted on the above mentioned rotating structure 28, at diametrically opposite positions. The rotating structure is driven in rotation by a motor 29. The rotating heads 26a and 26b have azimuth gaps which are inclined by an angle of 6 degrees, for example, in mutually opposite directions. The angle of inclination is measured from the perpendicular to the scanning direction of the heads, as indicated in FIG. 2. As also indicated in FIG. 2, a track 35a is formed over one field period by the head 26a, and a track 35b is formed over the succeeding one field period by the head 26b. The two tracks 35a and 35b are in close contact with each other. Therafter, in the same manner, tracks 35c, 35d, . . . are successively formed, alternately by the heads 26a and 26b.

For example, a signal may be produced while the movable contact of the switcher 23 is rotating in the arrow direction X and recorded by the head 26a. A signal produced while the movable contact is rotating in the arrow direction Y may be recorded by the head 26b. A signal whose phase is advanced by 90° during every successive horizontal scanning period, as indicated at A0, A1, A2, . . . (FIG. 2), is recorded on the track 35a. On track 35b a signal whose phase lags by 90° during every successive horizontal scanning period, as indicated at B0, B1, B2, . . . , is recorded. These signals are recorded in contiguous tracks.

Then, $An = An-1 \angle 90°$ represents the relationship wherein the phase of the signal of the nth horizontal scanning period is advanced by 90° relative to the phase of the signal of the (n−1)th horizontal scanning period. $Bn = Bn-1 \angle -90°$ represents the relationship wherein the phase of the signal of the nth horizontal scanning period lags by 90° relative to the phase of the (n−1)th horizontal scanning period. The line correlation wherein the signal informations of mutually adjacent horizontal scanning periods are closely alike gives the following representation:

| | |
|---|---|
| A1 ~ A0 ∠ 90°, | B1 ~ B0 ∠ − 90° |
| A2 ~ A1 ∠ 90°, | B2 ~ B1 ∠ − 90° |
| A3 ~ A2 ∠ 90°, | B3 ~ B2 ∠ − 90° |
| . | . |
| . | . |
| . | . |
| An ~ An-1 ∠ 90°, | Bn ~ Bn-1 ∠ − 90° |

In magnetic recording and reproducing, in general, a moire occurs when a symmetrical distortion is produced, and cross modulation takes place between the frequency-modulated luminance signal and the frequency converted carrier chrominance signal. Within this moiré component, the largest frequency component is the frequency component 2fs which is twice the color sub-carrier frequency fs of the frequency converted carrier chrominance signal. Moreover, since this is a constant frequency, it is conspicuous.

The phases mutually differ by 90° for every pair of adjacent horizontal scanning periods on one and the same track. The phase of the color sub-carrier frequency fs of a first horizontal scanning period and the phase of the moire frequency component 2fs of a horizontal scanning period adjacent to the first horizontal scanning period differ by twice 90°, that is, 180°. For this reason, these phases have a phase inverted relationship. Consequently, the moiré components are substantially mutually nullified between the signals of mutually adjacent horizontal scanning periods. Therefore, the generation of moiré is effectively prevented in the system of the present invention.

Since fs is selected to be equal to $\frac{1}{2}f_H \cdot m$, this relationship may be rewritten as $2fs = f_H \cdot m$. With respect to the moire frequency component, the crests or valleys of the signal become aligned in the vertical direction for every horizontal scanning line, as indicated (FIG. 8) by solid-line circles with respect to horizontal scanning lines h1, h3, h5, . . . and by broken-line circles with respect to horizontal scanning lines h2, h4, . . . However, as described above, the phase is staggered by 90° for every successive horizontal scanning period. For this reason, the positions of the crests or valleys of the signal are staggered as indicated by solid-line circles with respect to the horizontal scanning lines h2, h4, . . . Therefore, as a resultant effect, the moire frequency component becomes visually inconspicuous.

Next to be described is an embodiment (FIG. 3) of a system according to the invention for reproducing a signal recorded in the above described manner on a recording tape.

In this system, the signals recorded on the tracks on the tape 27 are alternately reproduced by the rotating heads 26a and 26b. For this operation, these rotating heads are controlled so that the head 26a scans the tracks 35a, 35c, . . . The head 26b scans the tracks 35b, 35d, . . . As is known, one control pulse may be recorded on the edge of the tape 27 for each revolution of the rotating structure 28 to select the recording head.

The signals reproduced by the rotating heads 26a and 26b are mixed and amplified by a reproducing amplifier 40. Thereafter, the signal is supplied to a high-pass filter 42 having a lower-limit filtering frequency of 1.2 MHz and to a low-pass filter 47 having an upper-limit filtering frequency of 1.2 MHz. The frequency-modulated luminance signal which has passed through the high-pass filter 42 is limited at 43 and demodulated by demodulator 44. The demodulated luminance signal is sent through a low-pass filter 45, where its unwanted component is removed, and thereafter is supplied to a mixer 46.

The carrier chrominance signal which has passed through the low-pass filter 47 is supplied to a frequency converter 48. There it is frequency converted responsive to a frequency signal from an automatic phase compensation (APC) circuit 49, thereby being restored to its original frequency band.

Here, the color sub-carrier frequency fs of the frequency converted carrier chrominance signal supplied to the frequency converter 48 is frequency converted by a frequency $f_A$ from the APC circuit 49. The color sub-carrier frequency fs is restored to the original color sub-carrier frequency fc by deriving the difference frequency ($f_A$-fs). Since the frequency conversion is carried out by taking a difference frequency, the carrier chrominance signal is phase inverted in the frequency converter 48. Consequently, the above described frequency conversion changes the signals reproduced from tracks 35a, 35c, . . . (recorded with phases advanced by 90° for every successive horizontal scanning period) into signals having phases which successively lag by 90°. Similarly, the signals reproduced from the tracks 35b, 35d, . . . (recorded with phases which lag by 90° for every successive horizontal scanning period) are changed into signals having phases which are successively advanced by 90°.

Figure 4:
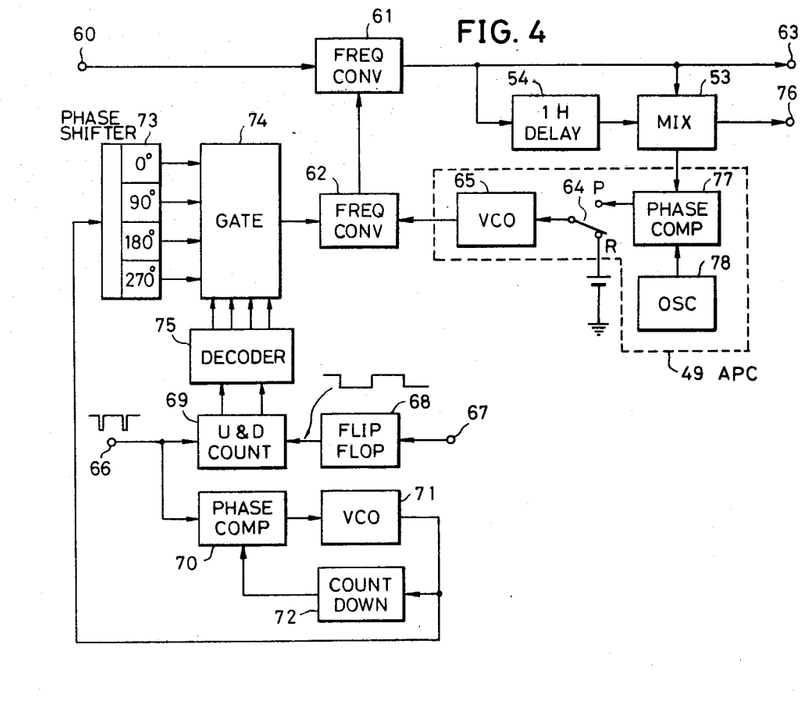
FIG. 4 is a block diagram showing the essential parts of a second embodiment of the system of the invention.

The output carrier chrominance signal of the frequency converter 48 is supplied to a phase shifter 51 of a phase shifting circuit 50. This phase shifting circuit 50 has the same circuit as the aforedescribed phase shifting circuit 21 and comprises the phase shifter 51 which is the same as the phase shifter 22 and a switcher 52 which is the same as the switcher 23. The switcher 52 has a movable rotation contact, controlled by the output of a switcher control circuit 41 responsive to a signal detected by the rotation detector 30. Circuit 41 is also controlled by the output of a horizontal synchronizing signal separation circuit 56, for separating a horizontal synchronizing signal from the output reproduced color video signal of the mixer 46. In FIG. 4, the phase shifting circuit 21 of the recording system and the phase shifting circuit 50 of the reproducing system are replaced by a single phase shifting circuit for performing the functions of the two circuits 22 and 51.

The movable contact of the switcher 52 (FIG. 3) rotates in the arrow direction X, with respect to the signals reproduced from the recording tracks 35a, 35c, . . . which have phases successively lagging by 90° responsive to a frequency conversion. The phases are now advanced successively by 90° to restore8c their original state. Similarly, the movable phase of the switcher 52 rotates in the arrow direction Y with respect to signals reproduced from the recording tracks 35b, 35d, . . . which have phases successively advanced responsive to a 90° by frequency conversion. These phases are now retarded successively by 90° to restore their original state.

The phase of the carrier chrominance signal has been thus restored to its normal state by the phase shifting circuit. The restored signal 50 is supplied to a mixer 53 and to a one-horizontal-scanning-period (abbreviated 1H) delay line 54. The signal is delayed by one horizontal scanning period by the 1H delay line 54 before the mixer 53 mixes it with the signal supplied directly from the phase shifting circuit 50. The carrier chrominance output signal from the mixer 53 is supplied, on one hand, to the mixer 46 where it is mixed with the luminance signal to form a reproduced color video signal at output terminal 55. On the other hand, the output carrier chrominance signal of the mixer 53 is supplied to the APC circuit 49, which extracts a color burst signal from the carrier chrominance signal to produce a signal output synchronized with the phase of the color burst signal. This output signal is supplied to the frequency converter 48.

The head 26a reproduces a signal A3 from the track 35a. For example, a signal $\overline{A3} \angle 90°$ (where $\overline{A3}$ indicates that the signal has been phase inverted by the frequency conversion) is produced as the output of the phase shifting circuit 50. Here, $\overline{A3}\angle 90° \simeq \overline{A2\angle 90°}\angle 90° = A2\angle -90°\angle 90° = A2$.

Accordingly, the head reproduces a signal An, and a signal $\overline{An}\angle 90° = An-1$ is produced as output from the phase shifting circuit 50. Since there is line correlation, the information contents A′n and A′n−1 of the signals An and An−1 have the relationship A′n≃A′n−1. If the head 26a is reproducing the signal An, a signal An−2 is similarly produced as output from the 1H delay line. As a consequence, a signal (An−1+An−2) is led out from the mixer 53, and, in terms of information content, a signal $A'n + A'n - 1 \simeq 2A'n$ is obtained.

If there is a tracking error by the heads, and the head 26a reproduces both track 35b and track 35a, there is a problem of crosstalk, which will now be described.

It will be assumed, for example, that the head 26a has reproduced simultaneously the signal B1 of track 35b and the signal A3 of the track 35a. With respect to the signal of track 35a, a signal (A2+A1) (2A′3 in terms of information content) is obtained from the mixer 53. The phase shifting circuit 50 processes a similar signal with respect to the signal B1, which is reproduced at the same time. For this reason, a signal B1∠90° is obtained from the phase shifting circuit 50.

Then, $\overline{B1}\angle 90° = \overline{Bo\angle -90°}\angle 90° = Bo\angle 90°\angle 90° = Bo\angle 180° = Bo\angle -180°$. Consequently, a signal Bo∠−180° and a signal Bo are respectively supplied, from the phase shifting circuit 50 and the 1H delay line 54, to the mixer 53. Then, Bo∠−180°+Bo=0. Thus, the reproduced signals of the track 35b are mutually nullified in the mixer 53, and the resulting output becomes zero. Therefore, the crosstalk components from adjacent tracks are removed, and they do not appear in any manner in the resulting output.

If the head 26b reproduces simultaneously the track 35a or 35c while reproducing the track 35b the crosstalk components are similarly removed in an effective manner.

FIG. 4 shows, in block diagram, an essential part of a second embodiment of the invention. Phase shifting and frequency conversion are carried out simultaneously. Moreover, a phase shifting circuit and frequency converters are commonly used for both recording and reproducing.

Figure 1:
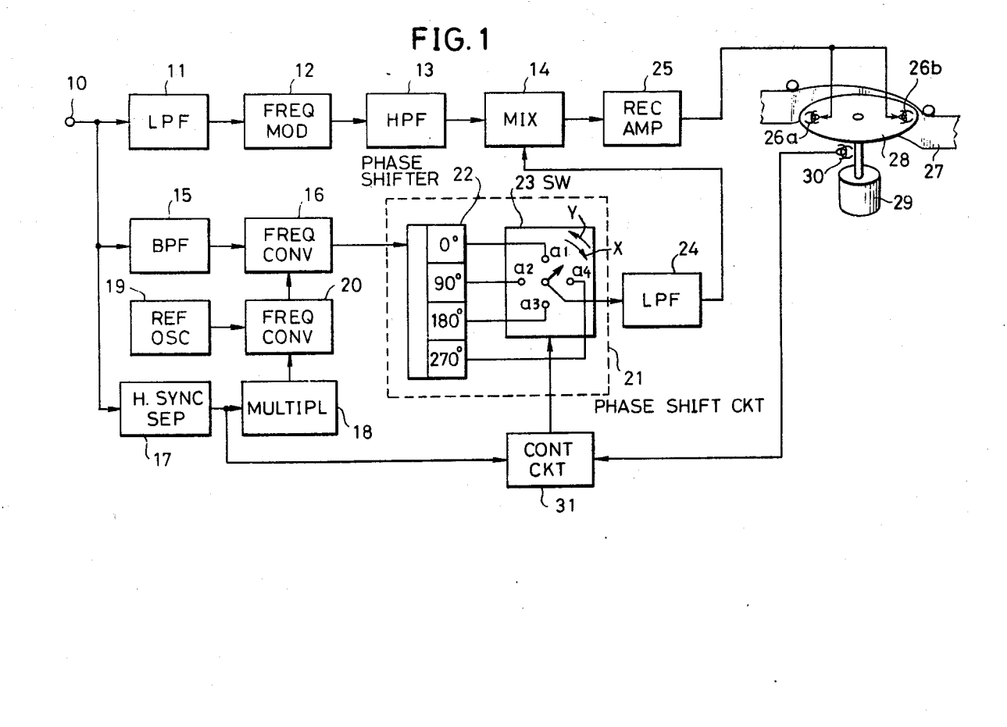
FIG. 1 is a block diagram of the recording system of a first embodiment of a color video signal recording and reproducing system according to the present invention.

At the time of recording, a carrier chrominance signal is separated from an input color video signal by a band-pass filter which is similar to the band-pass filter 15 shown in FIG. 1. The input signal is supplied through terminal 60 to a frequency converter 61. In this frequency converter 61, the carrier chrominance signal is frequency converted to a band which is lower than the frequency-modulated luminance signal, responsive to a signal from a frequency converter 62. The frequency converted color sub-carrier frequency fs of the carrier chrominance signal is indicated by Eq.(1), set forth hereinbefore. The output of the frequency converter 61 is led out through an output terminal 63. After passing through the low-pass filter 24 and being mixed with the frequency-modulated luminance signal, it is recorded by the heads 26a and 26b on the tape 27, as in FIG. 1.

At the time of recording the movable contact of a changeover switch 64 is in contact with a fixed contact point R. A constant voltage is applied to a voltage-controlled oscillator (VCO) 65. Consequently, the output oscillation frequency fc of the VCO 65 is constant. This output is supplied to the frequency converter 62.

A horizontal synchronizing signal from the horizontal synchronizing signal separation circuit 17 is supplied through a terminal 66 to an up-down counter 69. A signal from the detector 30 is supplied through a terminal 67 to a flip-flop circuit 68. A rotating synchronizing signal is changed over between high level and low level responsive to every vertical period supplied from the flip-flop circuit 68 to the uo-down counter 69. As a consequence, the up-down counter 69 counts from 0 to 3 with 2 bits. For example, alternately repeating addition (advancing) and subtraction (lagging) operations of the horizontal synchronizing signal for every vertical period. As a result, the up-down counter 69 counts one-by-one (00→01→10→11→00→...) every 1H in one vertical period and subtracts counts one-by-one (00→11→10→01→00→...) every 1H in the succeeding one vertical period.

Furthermore, the horizontal synchronizing signal introduced through the terminal 66 is supplied to a phase comparator 70. There its phase is compared with the phase of a signal from a count-down circuit 72. The resulting output error signal of this phase comparator 70 is supplied to control the output frequency of a VCO 71 having a center frequency 4fs. The resulting output of this VCO 71 is supplied to the countdown circuit 72. There its frequency is stepped down 1/176, for example, to become the same as the horizontal scanning frequency $f_H$. It is thereafter supplied to the phase comparator 70.

Simultaneously, the output frequency 176 $f_H$ of the VCO 71 is supplied to a phase shifter 73. There it is subjected to a count down and phase shift to produce four kinds of signals of the frequency fs with phases mutually differing by 90°. These four signals have phase differences 0°, 90°, 180°, and 270° and are supplied to a gate circuit 74. This gate circuit 74 receives the output of a decoder 75 which operates in response to the up-down counter 69, to activate only one line. The gate circuit 74 operates accordingly to supply the four outputs of phase shifter 73, every 1H period, to the frequency converter 62. As a consequence, the frequency converter 62 supplies to frequency converter 61 an output of a frequency (fc+44 $f_H$) and a phase successively shifting by 90° every 1H. There is an inversion of phase shifting direction every vertical period.

Accordingly, the carrier chrominance signal of a color sub-carrier frequency fc is introduced through the terminal 60 and frequency converted to a color sub-carrier frequency fs (=44 $f_H$) in the frequency converter 61. At the same time, the phase of the carrier chrominance signal is successively shifted every 1H with a phase shifting direction (i.e., advancing phase or lagging phase) which is alternately changed over every vertical period. As a result, an output signal is obtained which is the same as the output of the phase shifting circuit 21.

At the time of reproduction, the movable contact of the switch is placed on a fixed contact point P. A carrier chrominance signal is separated from a reproduced signal by the low-pass filter 47 shown in FIG. 3 and supplied through the input terminal 60 to the frequency converter 61. Furthermore, a horizontal synchronizing signal from the horizontal synchronizing signal separation circuit 56 is supplied through the terminal 66 to the up-down counter 69. The output signal of the detector 30 is applied to the terminal 67 as in the recording mode.

The output of the frequency converter 61 is supplied directly to the mixer 53 and by way of the 1H delay line 54 to the mixer 53. The reproduced carrier chrominance signal produced by the mixer 53 is led out through an output terminal 76 and supplied to the mixer 46. Furthermore, the output signal of the mixer 53 is supplied to a phase comparator 77 of the APC circuit 49. There it undergoes a phase comparison with a signal of the frequency fc from a reference oscillator 78. The resulting output of the phase cmparator 77 is supplied by way of the switch 64 to the VCO 65, to control the oscillation frequency thereof. As a result of the APC circuit 49, the phase of the color burst signal of the reproduced signal is maintained constant. A reproduced carrier chrominance signal without a timebase fluctuation component. As the time of reproduction, the output from the output terminal 63 is not used.

The flip-flop circuit 68, up-down counter 69, phase comparator 70, VCO 71, count-down circuit 72, phase shifter 73, gate circuit 74, and decoder 75 operate the same as in the above described recording mode. These operations will not be described again. They cause a normal reproduced signal which is obtained from the reproduced signal of a normal track. The beat disturbance, due to the reproduced signal of an adjacent track, is removed. These features are exactly the same as described hereinbefore with reference to FIG. 3.

Figures 5, 8:
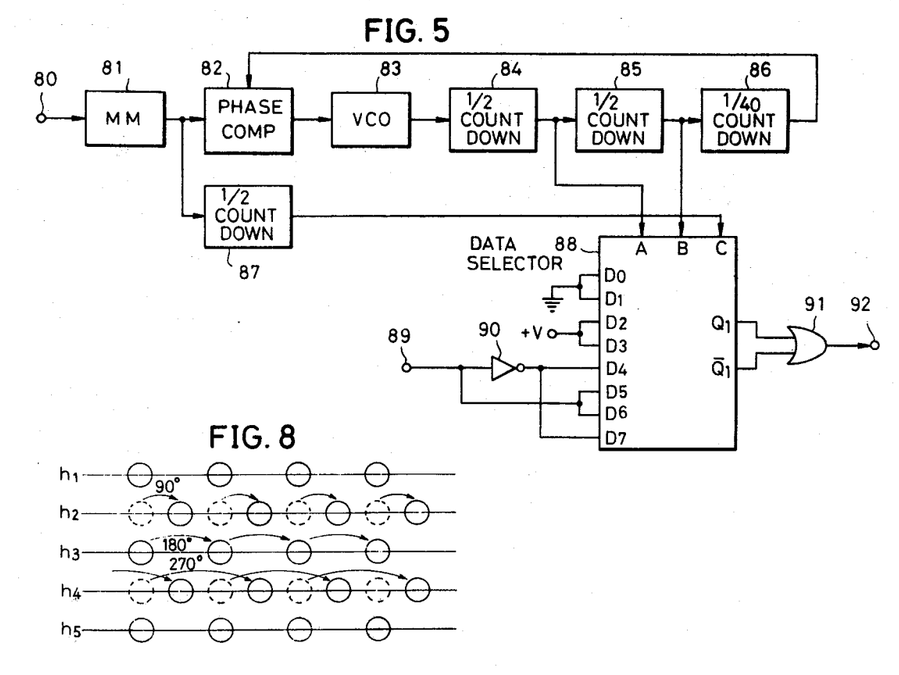
FIG. 5 is a block diagram showing another embodiment of the essential parts of the system illustrated in FIG. 4.
FIG. 8 is a diagram for explaining why the moire is inconspicuous.

Another embodiment of the phase shifting circuit illustrated in FIG. 4 will now be described with reference to FIG. 5.

A horizontal scanning frequency $f_H$ is supplied through a terminal 80 to a monostable multivibrator 81. The resulting output signal is supplied to a phase comparator 82 and a ½ count-down circuit 87. The output of the phase comparator 82 is supplied to a VCO 83 to control the frequency thereof. The resulting output of VCO 83 is successively counted down by ½ count-down circuits 84 and 85 and a 1/40 count-down circuit 86. Then, it is fed to the phase comparator 82. In the instant embodiment, the value of m is 80. The circuit forming the loop including the comparator 82 through the 1/40 count-down circuit 86 corresponds to the AFC circuit comprising the phase comparator 70, the VCO 71, and the count-down circuit 72 shown in FIG. 4.

The outputs of the count-down circuits 84, 85, and 87 are respectively supplied to address input terminals A, B, and C of an 8-line data selector 88. The data selector 88 has data input terminals D0 and D1 which are grounded. Data input terminals D2 and D3 are marked by a voltage +V input terminals D4 and D7 are connected to the output of inverter 90. Data input terminals D5 and D6 receive changeover pulses which are supplied through a terminal 89 and switched between a high level H and a low level L every vertical period.

The data selector 88 has an output terminal Q1. The signal at terminal Q1 indicates the data input terminal of the address which is designated in conformance with a binary code applied to the address input terminals A, B, and C. The data selector 88 also has an output terminal $\overline{Q1}$ which is an inversion of the output at the terminal Q1. The outputs at these terminals Q1 and $\overline{Q1}$ are passed through an OR gate 91 to output terminal 92. From this output terminal 92, a signal is led out with a phase which successively advances by 90° in one vertical period and which is successively delayed by 90° in the succeeding one vertical period. This signal at terminal 92 is supplied to the frequency converter 62.

In each of the above described embodiments of the invention, the recorded and reproduced color video signal is an NTSC system color video signal, However, a PAL system color video signal can also be recorded and reproduced by the system of the present invention, as now described with respect to an embodiment thereof.

Figure 6:
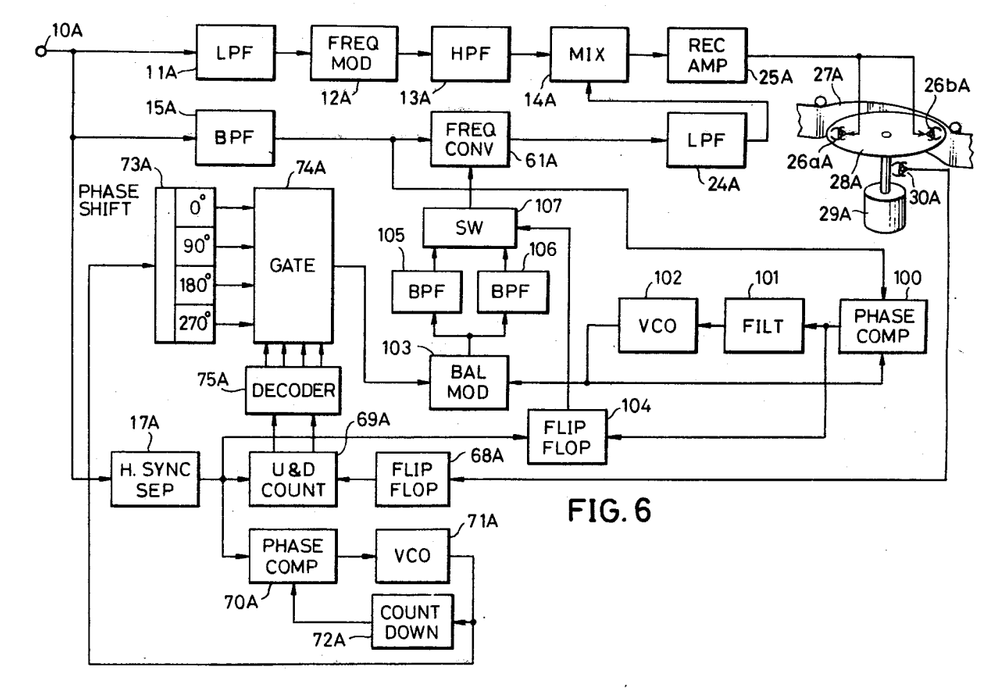
FIG. 6 is a block diagram of the recording system of a third embodiment of a color video signal recording and reproducing system of the invention.

FIG. 6 is a block diagram of a PAL system color video signal recording and reproducing system. In FIG. 6, the parts which are the same as corresponding parts in FIGS. 1 and 4 are designated by like reference numerals and characters with suffix A. The description of such parts will not be repeated.

In a PAL system color video signal, the color subcarrier frequency is 4.43 MHz, the horizontal scaning frequency is 15.63 KHz, the vertical synchronizing frequency is 50 Hz, and so forth. The frequency relationships of parts for which the above explanation is omitted are, of course, appropriately selected in conformance with the various frequency relationships of a PAL system color video signal. For example, the center frequency of the filtering band of the band-pass filter 15A is 4.43 MHz, the output signal frequency of the gate circuit 74A is 688 KHz, the output signal frequency of the horizontal synchronizing signal separation circuit 17A is 15.63 KHz; and the output signal frequency of the flip-flop circuit 68A is 25 Hz.

A carrier chrominance signal separated from a PAL system color video signal at the band-pass filter 15A is supplied to a frequency converter 61A and a phase comparator 100. The output of the phae comparator 100 is sent through a filter 101 where its fluctuation component is removed for every 1H period. Thereafter, the signal is supplied to control the frequency of a crystal VCO 102 having a center frequency of 4.43 MHz. The output of the VCO 102 is supplied as a phase coparison signal to the phase comparator 100 and to a balanced modulator 103.

The balanced modulator 103 produces, as outputs, the frequencies of the sum and difference of the output signals of the gate circuit 74A and the VCO 102. The output sum frequency 5.12 MHz (upper side-band) of this balanced modulator 103 passes through a band-pass filter 105, while the output difference frequency 3.74 MHz (lower side-band) thereof passes through a band-pass filter 106, after which these sum and differences frequencies are respectively supplied to an electronic switcher 107.

The horizontal synchronizing signal from the horizontal synchronizing signal separation circuit 17A is supplied to a flip-flop circuit 104. From there an output is inverted every 1H period and supplied to the electronic switcher 107. The flip-flop circuit 104 also receives the output signal of the phase comparator 100 and is thereby reset. The inverting polarity of the output signal of the flip-flop circuit 104 is always caused to coincide with the inverting polarity of the V-axis of the input PAL system color video signal.

The electronic switcher 107 operates in response to the output of the flip-flop circuit 104 to carry out switching to permit the outputs of the band-pass filters 105 and 106 to pass alternately every 1H period and thus be supplied to the frequency converter 61A. The carrier chrominance signal of a color sub-carrier frequency of 4.43 MHz is supplied to the frequency converter 61A and frequency converted by signals of frequencies of 5.12 MHz and 3.74 MHz. These frequencies are supplied alternately every 1H period and are delivered as the output of a carrier chrominance signal of a constant color sub-carrier frequency of 688 KHz. In the above described frequency conversion operation, the difference between the carrier chrominance signal and a signal for frequency conversion is inverted every other 1H period. Therefore, the carrier chrominance signal is inverted every other 1H period.

In the carrier chrominance signal of a PAL system color video signal, the V-axis component undergoes an inversion, symmetrically with respect to its U-axis, every 1H period. Accordingly, as a result of a carrier chrominance signal of this character being frequency converted at 61A, the V-axis component thereof is constantly directed in one direction, and is thereby converted into an artifical NTSC system signal. By being thus frequency converted by the frequency converter 61A, this signal is simultaneously phase shifted successively by 90° every 1H. Moreover, its phase shifting direction is inverted every alternate vertical period. This is similar to each of the foregoing embodiments of the invention. Furthermore, the color sub-carrier frequency f's of the carrier chrominance signal is frequency converted ½ m times (44 times in the instant embodiment) the horizontal scanning frequency $f_H$. Moreover, it is phase shifted by 90° every 1H. For this reason, the moire is effectively prevented, similar to each of the preceding embodiments of the invention.

The output carrier chrominance signal of the frequency converter 61A is multiplexed with the frequency-modulated luminance signal. The resulting multiplexed signal is recorded with a track pattern as shown in FIG. 2. This recording is the same as that of the embodiment illustrated in FIG. 1.

Figure 7:
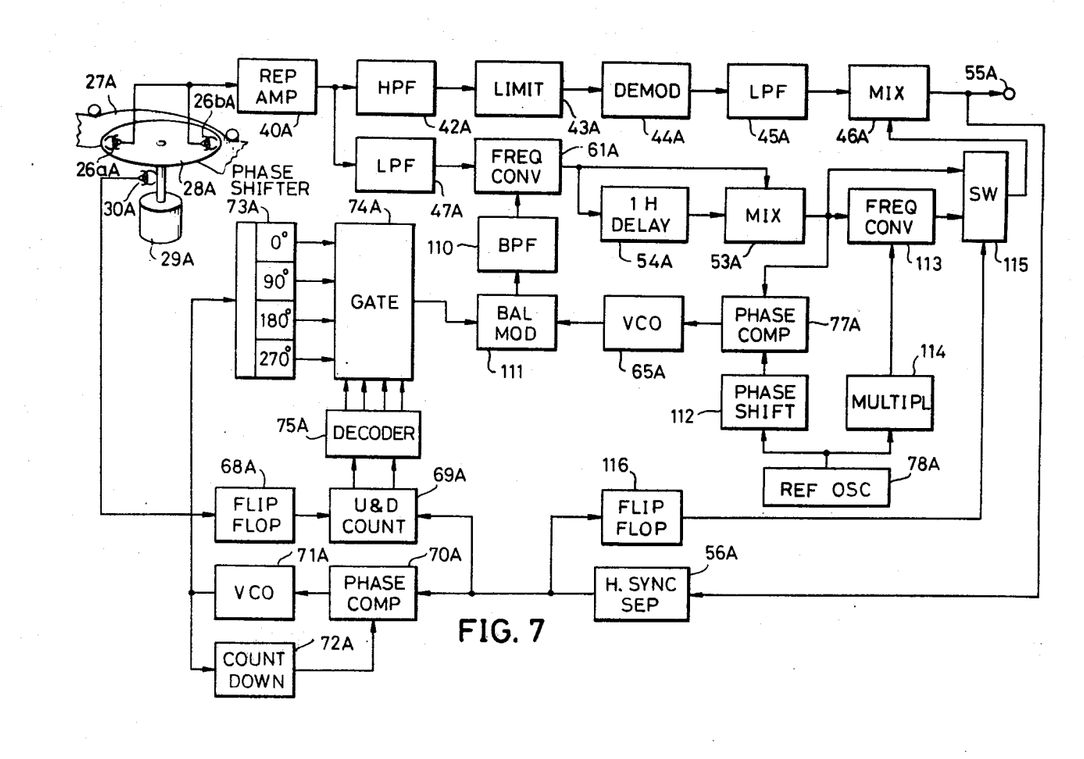
FIG. 7 is a block diagram of the reproducing system of the third embodiment of the system of the invention.

FIG. 7 shows an embodiment of a reproducing system for reproducing the signal recorded in the above described manner. In FIG. 7, the parts which correspond to the parts in the block systems illustrated in FIGS. 3 and 4 are designated by like reference numerals with the addition of the suffix A. Such parts will not be described again.

A carrier chrominance signal is separated from a reproduced multiplexed signal in the low-pass filter 47A. It is frequency converted to a lower frequency band and supplied to the frequency converter 61A. The carrier chrominance signal is the frequency converted, responsive to a signal from a band-pass filter 110 hereinafter, into the original band. Then, it is supplied to the mixer 53A and the 1H delay line 54A. The mixer 53A performs an addition of informations. Since the carrier phase of the signal passing through the 1H delay line 54A is of exactly an opposite phase, the mixer 53A is a subtraction circuit.

The output signal of this mixer 53A is supplied to the phase comparator 77A. The output signal of 4.43 MHz of the crystal reference oscillator 78A is phase shifted 45° in a phase shifter 112 and then supplied to the phase comparator 77A. The phase shifter 112 is used since the vector of the burst signal in a PAL system color video signal has an angle of 45° relative to the U-axis. The output of the phase comparator 77A controls the frequency of the VCO 65A, and the resulting frequency 4.43 MHz is supplied to a balanced modulator 111.

This balanced modulator 111 produces a sum frequency of 5.12 MHz and a difference frequency of 3.74 MHz from an addition and subtraction 688 KHz from the gate circuit 74A and 4.43 MHz from the VCO 65A. Of these, the frequency of 5.12 MHz passes through band-pass filter 110, to the frequency converter 61A. The output of the balanced modulator 111 is a signal which is phase shifted by 90° for every successive 1H period. The direction of shifting phase shifting is changed over every alternate vertical period. The carrier chrominance signal is restored without a 90° phase shift, simultaneously with its frequency conversion by the frequency converter 61A. This is similar to the preceding embodiments of the invention illustrated in FIGS. 3 and 4. Beat disturbance is effectively eliminated as a result of the mixing of the output signal of the frequency converter 61A and the signal which is delayed by 1H period. These signals are mixed in mixer 53A.

The output signal of the mixer 53A is supplied to a frequency converter 113 and to an electronic switcher 115. On one hand, the output of the reference oscillator 78A is doubled in a multiplier circuit 114 and supplied, as a signal of 8.86 MHz to the frequency converter 113. The output carrier chrominance signal of the mixer 53A is frequency converted by the frequency converter 113. A signal which is the same 4.43 MHz frequency and which has been phase inverted (that is it, has a V-axis component which has been inverted) is led out and supplied to the electronic switcher 115.

On the other hand, the horizontal synchronizing signal is supplied from the horizontal synchronizing signal separation circuit 56A to a flip-flop circuit 116. The output of circuit 116 is inverted for every 1H period, and used to control the switching operation of the electronic switcher 115. The electronic switcher 115 passes every alternate 1H in the output signal of the mixer 53A and the output signal of the frequency converter 113. The electronic switcher 115 gives a carrier chrominance signal wherein the V-axis direction component is inverted every 1H period, that is, the signal has been restored to that of the PAL system signal. Mixer 46A mixed this output carrier chrominance signal with the demodulated luminance signal. A reproduced PAL system color video signal is led out through the output terminal 55A.

In accordance with the color video signal recording and reproducing system according to the invention, a recorded NTSC system color video signal can be reproduced from a recording tape as a PAL system color video signal. Furthermore, a recorded PAL system color video signal can be reproduced as a NTSC system color video signal.

Further, this invention is not limited to these embodiments but various variations and modifications may be made without departing from the scope and spirit of the invention.

What is claimed is:

1. A color video signal recording system comprising:
 first separation means for separating a luminance signal from an input color video signal;
 means for frequency modulating the separated luminance signal and producing a frequency-modulated output luminance signal;
 second separation means for separating a carrier chrominance signal from said input color video signal;
 first signal processing means for frequency converting the separated carrier chrominance signal to a band which is lower than the band of said frequency-modulated luminance signal and for advancing the phase of the carrier chrominance signal by 90° every successive horizontal scanning period during a specific period and for delaying the phase thereof by 90° every successive horizontal scanning period during a successive specific period; and recording means for multiplexing said frequency-modulated luminance signal and said carrier chrominance signal and recording the resulting multiplexed signal on a plurality of successive tracks which are mutually disposed in parallel on a recording medium, said recording means recorded adjacent tracks side-by-side with a carrier chrominance signal of a phase which is advanced successively by 90° opposite a carrier chrominance signal of a phase which is delayed successively by 90°.

2. A color video signal recording system as claimed in claim 1 and means whereby said first signal processing means interchanges said phase advancement and phase delay every vertical period, and said recording means records one field of signals in each track.

3. A color video signal for reproducing a signal recorded by the recording system as claimed in claim 2, comprising:

means for reproducing said signal recorded on said recording medium;

third separation means for separating the frequency-modulated luminance signal from the reproduced signal;

means for demodulating said frequency-modulated luminance separated signal;

fourth separation means for separating the signal processed carrier chrominance signal from said reproduced signal;

second frequency conversion signal processing means for restoring said signal processed carrier chrominance signal which was separated into the original frequency band and for shifting the phase by 90° every successive horizontal scanning period, thereby restoring the original carrier chrominance signal and its original phase;

means for delaying the output signal of said second signal processing means by one horizontal scanning period;

means for mixing the output signal of said second signal processing means and the output signal of said delay means; and means for mixing the demodulated luminance signal and the output carrier chrominance signal of said mixing means to produce a reproduced color video signal, in which said second signal processing means advances the phase in every other vertical period and delays the phase in every vertical period which alternates with said other vertical periods, with respect to the carrier chrominance signal which has been separated by the fourth separation means.

4. A color video signal recording system as claimed in claim 1 in which said first signal processing means includes means for frequency converting said separated carrier chrominance signal; and phase shifting means for advancing said phase successively by 90° and delaying said phase successively by 90° with respect to said frequency-converted carrier chrominance signal.

5. A color video signal for reproducing a signal recorded by the recording system as claimed in claim 3, comprising:

means for reproducing said signal recorded on said recording medium;

third separation means for separating the frequency-modulated luminance signal from the reproduced signal;

means for demodulating said frequency-modulated luminance separated signal;

fourth separation means for separating the signal processed carrier chrominance signal from said reproduced signal;

second frequency conversion signal processing means for restoring said signal processed carrier chrominance signal which was separated into the original frequency band and for shifting the phase by 90° every successive horizontal scanning period, thereby restoring the original carrier chrominance signal and its original phase;

means for delaying the output signal of said second signal processing means by one horizontal scanning period;

means for mixing the output signal of said second signal processing means and the output signal of said delay means; and means for mixing the demodulated luminance signal and the output carrier chrominance signal of said mixing means to produce a reproduced color video signal, in which said second signal processing means comprises: means for frequency converting said separated carrier chrominance signal to restore the original band; and phase shifting means for advancing or delaying the phase with respect to said carrier chrominance signal in order to convert said signals back into said original band with the same timing as the phase shifting means of said first signal processing means.

6. A color video signal recording system as claimed in claim 1 in which said first signal processing means comprises: means for forming a signal for frequency conversion which alternately advances successively by 90° and delays successively by 90° every said specific period; and means for frequency converting said separated carrier chrominance signal responsive to said signal for frequency conversion.

7. A color video signal recording system as claimed in claim 6 in which said input color video signal is an NTSC system color video signal, and said means for forming a signal for frequency conversion forms a signal for frequency conversion of a single constant frequency.

8. A color video signal for reproducing a signal recorded by the recording system as claimed in claim 4, comprising:

means for reproducing said signal recorded on said recording medium;

third separation means for separating the frequency-modulated luminance signal from the reproduced signal;

means for demodulating said frequency-modulated luminance separated signal;

fourth separation means for separating the signal processed carrier chrominance signal from said reproduced signal;

second frequency conversion signal processing means for restoring said signal processed carrier chrominance signal which was separated into the original frequency band and for shifting the phase by 90° every successive horizontal scanning period, thereby restoring the original carrier chrominance signal and its original phase;

means for delaying the output signal of said second signal processing means by one horizontal scanning period;

means for mixing the output signal of said second signal processing means and the output signal of said delay means;

means for mixing the demodulated luminance signal and the output carrier chrominance signal of said mixing means to produce a reproduced color video signal, in which said second signal processing means comprises: means for forming a signal for frequency conversion by alternately advancing said phase by 90° and delaying said phase by 90° every said specific period; and means for frequency converting said separated carrier chrominance signal by means of said signal for frequency conversion.

9. A color video signal reproducing system as claimed in claim 8 in which said means for forming the signal for frequency conversion forms a single constant frequency.

10. A color video signal recording system as claimed in claim 1 in which said input color video signal is a PAL system color video signal having a V-axis direction component which is inverted relative to the U-axis for every horizontal scanning period, and said first signal processing means processes a signal in a manner which causes said V-axis component to be inverted relative to the U-axis component for every other horizontal scanning period and which causes the V-axis components to be alined in one direction in every horizontal scanning period.

11. A color video signal recording system as claimed in claim 10 in which said first signal processing means comprises: means for forming a signal for frequency conversion which alternates said phase advancement successively by 90° and said delay successively by 90° every vertical period, and means for changing the frequency of said carrier chrominance signal over every horizontal scanning period at a frequency (f'c+f's) and a frequency (f'c−f's) (where f'c is a color sub-carrier frequency of said filtered carrier chrominance signal, and f's is a color sub-carrier frequency of said carrier chrominance signal which has been frequency converted); and first frequency conversion means responsive to said last named means for frequency converting said separated carrier chrominance signal of the color sub-carrier frequency f'c into a carrier chrominance signal of a color sub-carrier frequency f's.

12. A color video signal reproducing system for reproducing a signal recorded by the recording system as claimed in claim 1, said reproducing system comprising:

means for reproducing said signal recorded on said recording medium;

third separation means for separating the frequency-modulated luminance signal from the reproduced signal;

means for demodulating said frequency-modulated luminance separated signal;

fourth separation means for separating the signal processed carrier chrominance signal from said reproduced signal;

second frequency conversion signal processing means for restoring said signal processed carrier chrominance signal which was separated into the original frequency band and for shifting the phase by 90° every successive horizontal scanning perod, thereby restoring the original carrier chrominance signal and its original phase;

means for delaying the output signal of said second signal processing means by one horizontal scanning period;

means for mixing the output signal of said second signal processing means and the output signal of said delay means; and means for mixing the demodulated luminance signal and the output carrier chrominance signal of said mixing means to produce a reproduced color video signal.

13. A color video signal reproducing system as defined in claim 12, in which said second signal processing means comprises:

first oscillator means for generating a first frequency which is an integer multiple of the horizontal scanning frequency;

shifting means for phase shifting the first frequency output of said first oscillator means by 0°, 90°, 180° and 270°, respectively;

switching means for selectively passing one of the four phase shifted signals of said shifting means;

control means for controlling said switching means in such a manner that the phase of the output signal of said switching means advances by 90° every successive horizontal scanning period during a specific period and alternately therewith delays by 90° every successive horizontal scanning period during a successive specific period;

second oscillator means for generating a second frequency which is equal to the carrier frequency of the original carrier chrominance signal;

first converter means responsive to the phase shifted signal of said switching means and to the signal generated by said second oscillator means for producing a first frequency converted signal which has a frequency equal to the sum of the first and the second frequency; and second converter means responsive to the separated carrier chrominance signal and to the output signal of said first converter means for restoring the original carrier chrominance signal.

14. A color video signal reproducing system as defined in claim 13 in which the specific period equals the vertical period of the original color video signal.

15. A color video signal reproducing system for reproducing a signal recorded by the recording system as claimed in claim 10, said reproducing system comprising:

means for reproducing said signal recorded on said recording medium;

third separation means for separating the frequency-modulated luminance signal from the reproduced signal;

means for demodulating the frequency-modulated luminance separated signal;

fourth separation means for separating the signal processed carrier chrominance signal from said reproduced signal;

second frequency conversion signal processing means for restoring said signal processed carrier chrominance signal which was separated, into the original frequency band and for shifting the phase by 90° every successive horizontal scanning period, thereby producing a carrier chrominance signal having the original frequency, of which V-axis components are alined in one direction in every horizontal scanning period;

means for delaying the output signal of said second signal processing means by one horizontal scanning period;

first mixing means for mixing the output signal of said second signal processing means and the output signal of said delay means;

inverting means for inverting the V-axis component relative to the U-axis during every other horizontal scanning period and restoring the original carrier chrominance signal of the PAL system wherein the V-axis component is inverted relative to the U-axis during every other horizontal scanning period; and second mixing means for mixing the demodulated luminance signal and the output carrier chrominance signal of said inverting means to produce a reproduced color video signal.

16. A color video signal reproducing system as clamed in claim 15 in which said second signal processing means comprises means for forming a signal for frequency conversion at a frequency (f'c+f's) for successively advancing said phase by 90° and alternately therewith delaying said phase by 90° during alternate vertical periods, and second frequency conversion means for frequency converting said separated carrier chrominance signal and processing said signal into the original frequency f'c by means of said signal for frequency conversion; and in which said inverting means comprises means for phase inverting the output signal of said first mixing means and converting the same into a signal wherein the V-axis component is inverted relative to the U-axis, and means for alternately deriving the output of said first mixing means and the output of said phase inverting means evey horizontal scanning period.

17. A color video signal recording system as defined in claim 1, in which said first signal processing means comprises:

first oscillator means for generating a first frequency which is an integer multiple of the horizontal scanning frequency;

shifting means for phase shifting the first frequency of said first oscillator means by 0°, 90°, 180° and 270°, respectively;

switching means for selectively passing one of the four phase shifted signals of said shifting means;

control means for controlling said switching means in such a manner that the passed phase of said switching means advances by 90° every successive horizontal scanning period during a specific period and alternately therewith delays by 90° every successive horizontal scanning period during a successive specific period;

second oscillator means for generating a second frequency which is equal to the carrier frequency of the chrominance signal of the input color video signal;

first converter means responsive to the phase shifted signal of said switching means and to the second frequency of said second oscillator means for producing a first frequency converted signal which has a third frequency equal to the sum of the first and the second frequency; and second converter means responsive to the separated carrier chrominance signal and the first frequency converted signal for producing a second frequency converted signal which has a carrier frequency equal to the first frequency;

in which said recording means multiplexes said frequency modulated luminance signal and said second frequency converted signal, and then records the resulting multiplexed signal.

18. A color video signal recording system as defined in claim 17, in which said control means controls said switching means in a manner such that the phase advance and the phase delay are alternated every vertical period, and said recording means records signals of one field on each track.

19. A color video signal recording system as defined in claim 1 in which the input color video signal is a PAL system color video signal, and said first signal processing means comprises:

first oscillator means for generating a first frequency which is an integer multiple of the horizontal scanning frequency of the PAL system;

first shifting means for phase shifting the first frequency of said first oscillator means by 0°, 90°, 180° and 270°, respectively;

first switching means for selectively passing one of the four phase shifted signals of said first shifting means;

first control means for controlling said first switching means in such a manner that the passed phase of the output signal of said first switching means advances by 90° every successive horizontal scanning period during a specific period and alternately therewith delays by 90° every successive horizontal scanning period during a successive specific period;

second oscillator means for generating a second frequency which is equal to the sub-carrier frequency of the PAL system;

first converter means responsive to the phase shifted signal of said first switching means and to the second frequency of said second oscillator means for producing a first and a second frequency converted signal, said first frequency converted signal having a frequency which is equal to the sum of the first and the second frequency, and said second frequency converted signal having a frequency which is equal to the difference between the second and the first frequency;

second switching means for alternately passing the first frequency converted signal and the second frequency converted signal every horizontal scanning period;

second converter means responsive to the separated PAL system carrier chrominance signal and the output signal of said second switching means for producing a third frequency converted signal having a carrier frequency equal to the first frequency, in which V-axis components are aligned in one direction;

and in which said recording means multiplexes the frequency modulated luminance signal and the third frequency converted signal and thereafter records the resulting multiplexed signal.

20. A color video signal reproducing system for reproducing a signal recorded by the recording system as defined in claim 19, said reproducing system comprising:

reproducing means for reproducing the signal recorded on the recording medium;

third separation means for separating the frequency-modulated luminance signal from the reproduced signal;

demodulation means for demodulating the separated frequency-modulated luminance signal;

fourth separation means for separating the signal processed carrier chrominance signal from the reproduced signal;

third oscillator means for generating the first frequency;

second shifting means for phase shifting the output signal of said third oscillator means by 0°, 90°, 180° and 270°, respectively;

third switching means for selectively passing one of the four phase shifted signals of said second shifting means;

second control means for controlling said third switching means in such a manner that the phase of the signal passed by said third switching means advances by 90° every successive horizontal scanning period during the specific period and alternately therewith delays by 90° every successive horizontal scanning period during the successive specific period;

fourth oscillator means for generating the second frequency;

third converter means responsive to the output generated by said fourth oscillator means and to the signal passed by said third switching means for producing a fourth frequency converted signal which has a frequency equal to the sum of the first and the second frequency;

fourth converter means responsive to the fourth frequency converted signal and to the signal of said fourth separation means for producing a carrier chrominance signal which has a carrier frequency equal to the original sub-carrier frequency of the PAL system;

delay means for delaying the output signal of said fourth converter means by one horizontal scanning period;

first mixing means for mixing the signal produced by said fourth converter means and the output signal of said delay means;

generating means for generating a signal having a frequency which is double the second frequency;

fifth converter means responsive to the signal generated by said generating means and to the output signal of said first mixing means for producing a signal having a carrier frequency which is equal to the difference between the doubled second frequency and the original sub-carrier frequency of the PAL system;

fourth switching means for alternately passing the signal mixed by said first mixing means and the signal provided by said fifth converter means every horizontal scanning period to restore the original carrier chrominance signal of the PAL system; and second mixing means for mixing the demodulated luminance signal and the output signal of said fourth switching means to produce a reproduced color video signal.

21. A color video signal recording and reproducing system comprising:

first separation means for separating a luminance signal from an input color video signal;

means for frequency modulating the separated luminance signal and producing a frequency-modulated luminance signal;

second separation means for separating a carrier chrominance signal from said input color video signal;

signal processing means operating in a recording mode to frequency convert the separated carrier chrominance signal into a band which is lower than the band of said frequency-modulated luminance signal and for advancing the phase of said carrier chrominance signal by 90° for every successive horizontal scanning period within a sepcific period and for delaying the phase by 90° for every successive horizontal scanning period within a succeeding specific period;

means for multiplexing said frequency-modulated luminance signal and said signal processed carrier chrominance signal, and means for recording the resulting multiplexed signal on a plurality of successive tracks which are parallel and side-by-side on a recording medium, said recording means advancing the phase of the carrier chrominance signal by 90° and delaying the phase of the carrier chrominance signal by 90°, to be aligned on mutually adjacent tracks;

means for reproducing said signal recorded on said recording medium;

third separation means for separating said frequency-modulated luminance signal from the reproduced signal;

means for demodulating said separated frequency-modulaed luminance signal;

fourth separation means for separating the signal processed carrier chrominance signal from said reproduced signal;

said signal processing means operating in a reproducing mode to frequency convert the carrier chrominance signal separated by said fourth separation means to restore the same to the original frequency band and for phase shifting by 90° during every horizontal scanning period to restore the same to the original carrier chrominance signal which has the original phase;

means for delaying by one horizontal scanning period the output signal of said second signal processing means;

means for mixing the output signal of said second signal processing means and the output signal of said delaying means; and means for mixing the demodulated luminance signal and the output carrier chrominance signal of said mixing means and for deriving the resulting signal as a reproduced color video signal.

22. A system for recording a composite color television signal on a plurality of tracks along a record medium, said signal including chrominance signal components representative of image information during recurring line and field intervals, said system comprising:

means for generating first and second reference signals, said first reference signal progressing in phase at a rate corresponding to said line interval, and said second reference signal regressing in phase at a rate corresponding to said line interval;

means for combining said chrominance signal components during traversal of adjacent ones of said tracks alternately with said first and second reference signals; and means for recording said combined signal on said record medium.

23. A signal reproducing system comprising:

means for recovering a line rate chrominance signal from a record medium, on which it was recorded in a plurality of closely adjacent tracks, by traversal of said tracks by a signal pickup device;

means for generating first and second reference signals which respectively progress and regress in phase at said line rate;

means for combining said chrominance signals obtained during traversal of alternate ones of said tracks with respective ones of said first and second ones of said reference signals; and filtering means responsive to said combined signals for rejecting frequency components of said combined signals occurring at integral multiples of said line rate and passing frequency components of said combined signals occurring at odd half-multiples of said associated line rate, for passing desired chrominance signal components and rejecting chrominance crosstalk components from adjacent ones of said tracks.

24. A color video signal recording system comprising:

first separation means for separating a luminance signal from an input color video signal;

modulation means for frequency modulating the separated luminance signal to produce a frequency-modulated luminance signal;

second separation means for separating a carrier chrominance signal from the input color video signal;

first conversion means for frequency converting the separated carrier chrominance signal to a band which is lower than the band of the frequency-modulated luminance signal;

first shifting means for phase shifting the frequency converted carrier chrominance signal by 0°, 90°, 180° and 270°, respectively;

first switching means for selectively passing one of the four signals which are phase shifted by said first shifting means;

first control means for controlling said first switching means in such a manner that the phase of the output signal of said first switching means advances by 90° every successive horizontal scanning period during a specific period and alternately therewith delays by 90° every successive horizontal scanning period during a successive specific period;

first mixing means for multiplexing the frequency modulated luminance signal and the output signal of said first switching means; and recording means for recording the resulting multiplexed signal on a successive plurality of side-by-side tracks, with a carrier chrominance signal of a phase which is advanced successively by 90° being recorded opposite a carrier chrominance signal of a phase which is delayed successively by 90°.

25. A color video signal reproducing system for reproducing a signal recorded by the recording system as defined in claim 24, said reproducing system comprising:

reproducing means for reproducing the signal recorded on the recording medium;

third separation means for separating the frequency-modulated luminance signal from the reproduced signal;

demodulation means for demodulating the separated frequency-modulated luminance signal;

fourth separation means for separating the signal processed carrier chrominance signal from the reproduced signal;

second conversion means for restoring the separated signal processed carrier chrominance signal into the original frequency band;

second shifting means for phase shifting the output signal of said second conversion means by 0°, 90°, 180° and 270°, respectively;

second switching means for selectively passing one of the four phase shifted signals of said second shifting means;

second control means for controlling said second switching means in such a manner that the phase of the signal passed by said second switching means advances by 90° every horizontal scanning period during the specific period and alternately therewith delays by 90° every successive horizontal scanning period during the successive specific period;

means for delaying the signal passed by said second switching means by one horizontal scanning period;

means for mixing the output signal of said second switching means and the output signal of said delay means; and means for mixing the demodulated luminance signal and the output carrier chrominance signal of said mixing means to produce a reproduced color video signal.

* * * * *

UNITED STATES PATENT AND TRADEMARK OFFICE
CERTIFICATE OF CORRECTION

PATENT NO. : 4,178,606
DATED : December 11, 1979
INVENTOR(S) : AKIRA HIROTA

It is certified that error appears in the above-identified patent and that said Letters Patent are hereby corrected as shown below:

Column 4, line 28, "Therafter" should read --Thereafter--.

Column 6, line 39, "restore8c" should read --restore--.

Column 9, line 2, "thrugh" should read --through--;

line 12, "maintined" should read --maintained--.

Column 13, line 7, claim 1, "recorded" should read --recording--;

line 17, claim 3, "signal" (first occurrence) should read --system--;

line 61, claim 5, "signal" (first occurrence) should read --system--;

line 62, claim 5, "claim 3" should read --claim 4--.

UNITED STATES PATENT AND TRADEMARK OFFICE
CERTIFICATE OF CORRECTION

PATENT NO. : 4,178,606
DATED : December 11, 1979
INVENTOR(S) : AKIRA HIROTA

It is certified that error appears in the above-identified patent and that said Letters Patent are hereby corrected as shown below:

Column 14, line 46, claim 8, "signal" (first occurrence) should read --system--.

Column 15, line 66, claim 12, "perod" should read --period--.

Column 17, line 18, claim 16, "clamed" should read --claimed--.

Column 20, line 7, claim 21, "sepcific" should read --specific--;

line 28, claim 21, "modulaed" should read --modulated--;

Signed and Sealed this

Twenty-ninth Day of July 1980

[SEAL]

Attest:

SIDNEY A. DIAMOND

Attesting Officer  Commissioner of Patents and Trademarks